United States Patent [19]

Cattani

[11] Patent Number: 4,614,456
[45] Date of Patent: Sep. 30, 1986

[54] SYSTEM FOR THE BIDIRECTIONAL LOCATION AND LOCKING OF MOBILE MEMBERS IN A REPETITIVE POSITION

[75] Inventor: Alberto Cattani, Modena, Italy

[73] Assignee: COMAU S.p.A., Grugliasco, Italy

[21] Appl. No.: 545,343

[22] Filed: Oct. 25, 1983

[30] Foreign Application Priority Data

Nov. 5, 1982 [IT] Italy .............................. 53891/82[U]

[51] Int. Cl.⁴ ...................... F16B 21/00; B23Q 3/155
[52] U.S. Cl. ........................................ 403/322; 29/568; 409/230
[58] Field of Search ................. 409/230, 144; 408/35, 408/53, 240; 29/568, 1 A, 26 A; 403/322; 901/41

[56] References Cited

U.S. PATENT DOCUMENTS

| | | | |
|---|---|---|---|
| 3,786,721 | 1/1974 | Reda | 29/1 A X |
| 3,797,363 | 3/1974 | Nohejl | 408/35 X |
| 3,858,286 | 1/1975 | Nohejl | 29/568 X |
| 4,216,572 | 8/1980 | Matsushita et al. | 29/568 |
| 4,562,919 | 1/1986 | Cattani | 29/568 X |

FOREIGN PATENT DOCUMENTS

| | | | |
|---|---|---|---|
| 1111906 | 7/1961 | Fed. Rep. of Germany | 29/1 A |
| 7748 | of 1914 | United Kingdom | 29/1 A |
| 811164 | 4/1959 | United Kingdom | 29/1 A |
| 529913 | 1/1977 | U.S.S.R. | 409/230 |

Primary Examiner—Gil Weidenfeld
Assistant Examiner—Steven C. Bishop
Attorney, Agent, or Firm—Young & Thompson

[57] ABSTRACT

A system for the bidirectional precision location and locking of mobile members in a repetitive position comprises structure for positioning the mobile member along its traversing axis and structure for locking the mobile member along the other two axes orthogonal to the traversing axis. The positioning structure is constituted by members which can be operated in order to engage with the two opposing sides of an abutment on the mobile member, while the locking structure is constituted by members which can be operated in order to couple to projections on the mobile member and to lock it against the fixed member.

7 Claims, 6 Drawing Figures

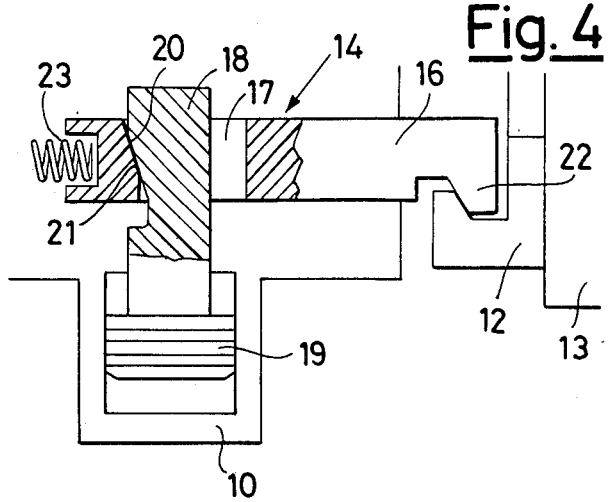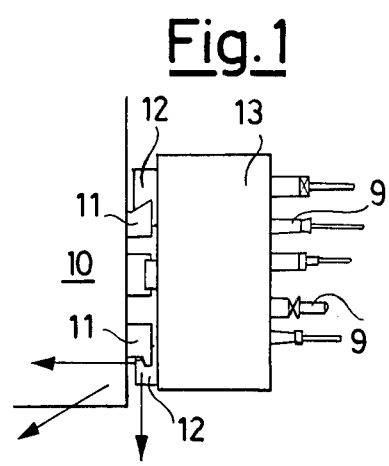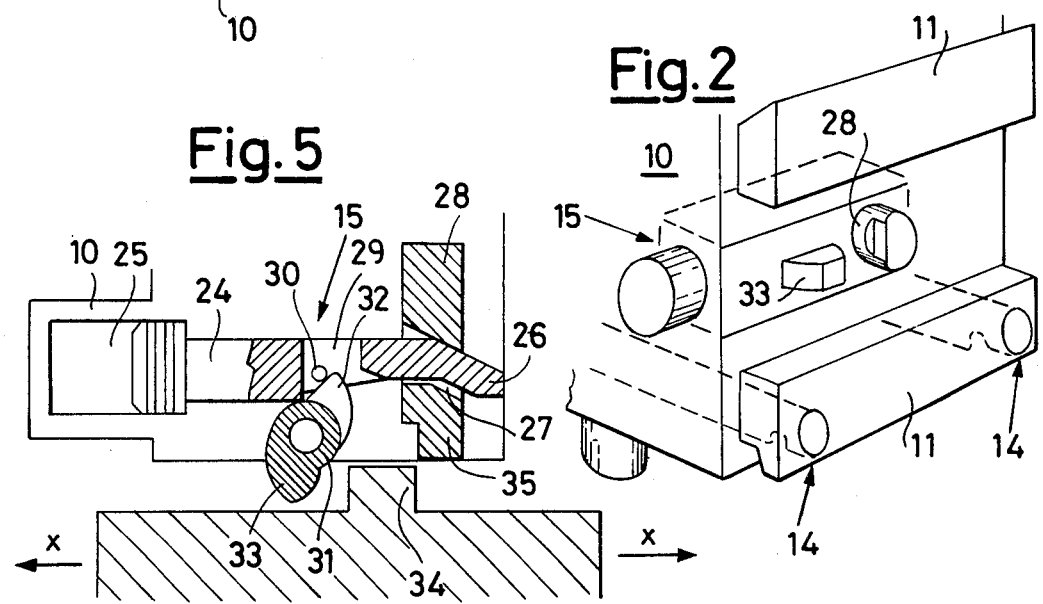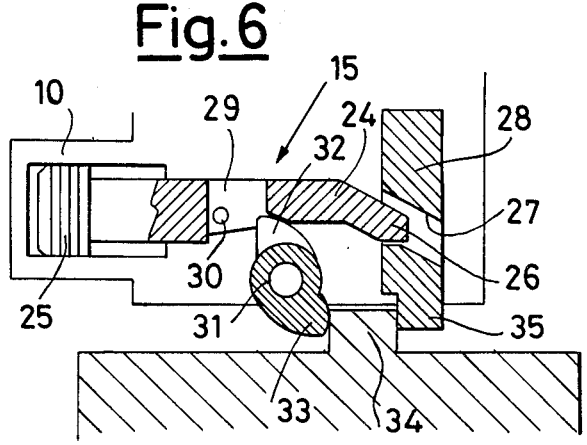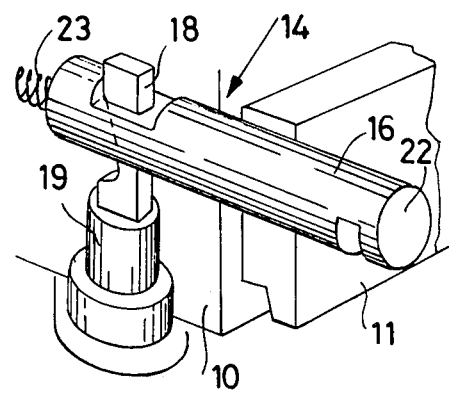

SYSTEM FOR THE BIDIRECTIONAL LOCATION AND LOCKING OF MOBILE MEMBERS IN A REPETITIVE POSITION

DESCRIPTION

The invention relates to a system for the bidirectional precision location and locking of mobile members in a repetitive position. A particular but not limiting application of the invention is in machine tools known as machining centres. In machines of this type, large tool heads can be used, each mounted removably on plates carried by chains. The tools of each head can either be in the form of several individual cutting tools, or large single tools (one for each head) for milling, reaming or other operations. In the machining of a work piece, it is therefore necessary to withdraw the required tool head at the correct moment from the tool crib formed from the various tool heads mounted on chains, and to transfer it to its working position.

On termination of the machining operation, the head is returned to the tool crib, from which the next required head is withdrawn, carrying other tools for further machining operations.

Each head is commonly mounted on dovetail-shaped guides on a plate rigid with the crib chains, and when the plate laterally reaches a position corresponding with the working zone, suitable pusher means transfer the head from the plate on to a corresponding support, which supports the head during the machining carried out by its tools.

On termination of the machining operation or operations, the same pusher means re-engage with the head and again transfer it to the plate which has remained in a waiting position, after which the chain continues its rotation, under command or programming, in order to move a new head into a lateral position corresponding with the working zone, in which a new head is again transferred on to it.

The operations involving the transfer of the heads to and from their working zone must be carried out with maximum precision and rapidity. In this respect, if precision is not guaranteed, the head can be hindered in its transfer from the plate to the support and vice versa, these latter being in exact mutually corresponding positions when the chains stops in order to present the head required for the programmed machining. The head must therefore be correctly locked and located on the plate and on the support, so as to be able to traverse in both directions without the danger of hindrance.

This is obviously advantageous not only in terms of the correct moving of the head, but also in terms of idle times which during a head change must be as short as possible.

Unidirectional locking systems are currently used for this purpose, they being complicated and not solving the aforesaid problems. This is because the systems for example do not allow take-up of the slack due to the wear of the fixed means (plate and support) and of the mobile means (heads).

The object of the invention is to propose a system which provides bidirectional precision location and locking, so that the mobile member, in this case the head, can be made to traverse on both sides of the fixed member.

This first advantage means that the invention can be used not only in machining centres, but also in any other applications in which bidirectional precision location and locking of mobile members relative to a fixed member in a repetitive position is required. According to the invention, the precision location is effected by means of a mechanical retractable abutment for locking the mobile member along the axis of motion, which ensures precision and repeatability of the positioning by virtue of the rigidity of the system and the take-up of any slack and wear. This results in considerable simplicity of construction and uniqueness of the system in that it uses a single actuator. Again according to the invention, the locking system uses coupling means for the mobile member which have the double function of location along the two remaining axes perpendicular to the axis of motion, and of locking against the fixed member. Again, a single actuator is used, leading to simplicity and economy of the system. These and further objects which will be more apparent hereinafter are attained according to the invention by a system for the bidirectional precision location and locking of mobile members in a repetitive position, characterised by comprising first means for positioning the mobile member along its traversing axis and means for locking the mobile member along the other two axes orthogonal to said traversing axis; said first means being constituted by members which can be operated in order to engage with the two opposing sides of an abutment on the mobile member, said second means being constituted by members which can be operated in order to couple to projections on the mobile member and to lock it against the fixed member.

A preferred embodiment of the invention is described hereinafter by way of example with reference to the accompanying drawing in which:

FIG. 1 is a diagrammatic side view of the tool head supported by a fixed member, FIG. 2 is a perspective view of the fixed member, FIG. 3 is a perspective view of a detail of FIG. 2, FIG. 4 is a partly sectional side view of FIG. 3, FIGS. 5 and 6 are longitudinal sections through a detail of FIG. 2 in the open and closed position respectively.

As stated, the system is of particular application to multiple head machining centres, although it can be used in many other fields in which the bidirectional precision location and locking of a mobile member relative to a fixed member is required. The description therefore relates to its application to machining centres only by way of example and for reasons of simplicity. In the figures, the reference numeral 10 diagrammatically indicates the fixed member which in this case is a support on the operating unit or a plate carried by a chain rotatably mounted on the tool crib of a machine tool.

The fixed member comprises two dovetail guides 11 with which corresponding guides 12 of a head 13 carrying tools 9 slidably engage.

The head 13 can therefore be withdrawn from the fixed member 10 in both directions along an axis x.

The system according to the invention comprises two devices, namely a locking device 14 (FIGS. 2, 3 and 4) and a locating device 15 (FIGS. 2, 5 and 6) for locking and locating the mobile member 13 relative to the fixed member 10.

The locking device 14 is constituted by two parallel arms 16 slidable in suitable seats in the fixed member 10 and provided with ends 22 arranged to couple to a guide 12 of the mobile member 13 when this latter is engaged with the fixed member.

Each arm 16 comprises a through bore 17 in which the rod 18 of a cylinder 19 slides. The rod 18 has a flat inclined surface 20 which abuts against a corresponding surface 21 of the bore of the arm.

As the arm 16 and rod 18 move along orthogonal axes, retraction of the rod 18 causes the arm 16 to move towards the interior of the fixed member against the spring 23, consequently locking the mobile member against the fixed member. Release is attained by extending the rod 18, so that the spring 23 urges the arm 16 outwards, to release the head 13.

A device is thus provided having the double function of locating the head 13 along two axes perpendicular to its traversing axis x, and locking it against the fixed member 10. The locking is thus made irreversible by virtue of the rigidity provided by the irreversible engagement between the inclined surfaces 20 and 21.

The location device 15 is constituted by the rod 24 of a cylinder 25 which is curved at its end 26 in order to slackly enter the corresponding bore 27 of a pin 28 slidable in suitable seats in the fixed member 10. The rod 24 is provided with a bore 29 comprising a stop tooth 30 for a double pawl 31, of which one tooth is inserted into said bore 29 while the other 33 is diametrically opposite the first. When the head 13 is inserted between the guides 11 of the fixed member, its tooth 34 is in the position shown in FIG. 5, and the rod 24 is extended, with its end 26 urging the pin 28 completely into the fixed member, and the tooth 30 rotating the pawl 31 so that its tooth 33 becomes aligned with the front wall of the fixed member.

This condition enables the head 13 to be inserted and withdrawn in both the directions x of the longitudinal traversing axis. Having reached the position of FIG. 5, the rod 24 is retracted to attain the position of FIG. 6, in which the end 26 has slid by way of its inclined surface against the corresponding surface of the bore 27 to urge the pin 28 outwards so that its end 35 abuts against one side of the tooth 34 of the head. Simultaneously the wall of the bore 29 of the rod 24 presses against the tooth 32 of the pawl 31, to rotate it and urge its other tooth 33 against the tooth 34 on the opposite side to that against which the pin 28 is positioned. A clamp 33, 35 is therefore created, to lock the tooth 34 and prevent any traversing of the head 13 along the axis x in either direction.

This retractable clamp (FIG. 6) ensures the precision and repeatability of the positioning by providing rigidity to the system and taking-up any slack and wear, by virtue of being a system of closed and irreversible forces.

I claim:

1. Apparatus for the bidirectional precision location and locking of a mobile member in a repetitive position relative to a fixed member, the fixed member having a slideway thereon along which the mobile member slides along a first axis, the mobile member having an abutment thereon having two opposing sides, means mounted on the fixed member for grasping and releasing said two opposing sides of the abutment to position the mobile member along said first axis, the mobile member having projections thereon, the fixed member having members thereon extensible and retractable into and out of engagement with said projections on the mobile member to lock the mobile member along second and third axes orthogonal to said first axis and to each other.

2. Apparatus as claimed in claim 1, said means for grasping and releasing said opposing sides of said abutment comprising a pin carried by said fixed member which is extensible and retractable relative to said fixed member to engage one of said opposing sides of said abutment, a pawl mounted for rotation on said fixed member, and means selectively to rotate the pawl into and out of engagement with the other of said opposing sides of said abutment.

3. Apparatus as claimed in claim 2, said rotating means comprising a fluid-pressure cylinder having a piston therein that advances and retracts a rod, said rod rotating said pawl and also advancing and retracting said pin.

4. Apparatus as claimed in claim 3, said pin having an opening therethrough with diagonal surfaces on opposite sides of said opening, said rod contacting one of said diagonal surfaces to advance the pin and the other of said diagonal surfaces to retract the pin.

5. Apparatus as claimed in claim 1, said extensible and retractable members comprising two parallel arms carried by said fixed member and movable relative to said fixed member toward and away from said mobile member, said arms having cam surfaces thereon parallel to said first axis and inclined to said second and third axes that engage with cam surfaces of the same inclination on said mobile member, thereby to urge said mobile member in the direction of said second and third axes upon retraction of said arms into said fixed member, thereby to lock the mobile member along said second and third axes.

6. Apparatus as claimed in claim 5, said arms each having a bore therethrough, and cylinders and pistons carried by the fixed member, the pistons having piston rods thereon that engage in said bores, said bores and piston rods having cam surfaces thereon such that the application of fluid pressure to the pistons will move the rods in a direction to cam the arms into the fixed member thereby to lock the mobile member along said second and third axes.

7. Apparatus as claimed in claim 6, and spring means acting between the fixed member and the arms to urge the arms outwardly of the fixed member.

* * * * *